Oct. 26, 1954  C. T. FOLSTAD  2,692,757
ICE-CUTTING DEVICE
Filed June 9, 1952
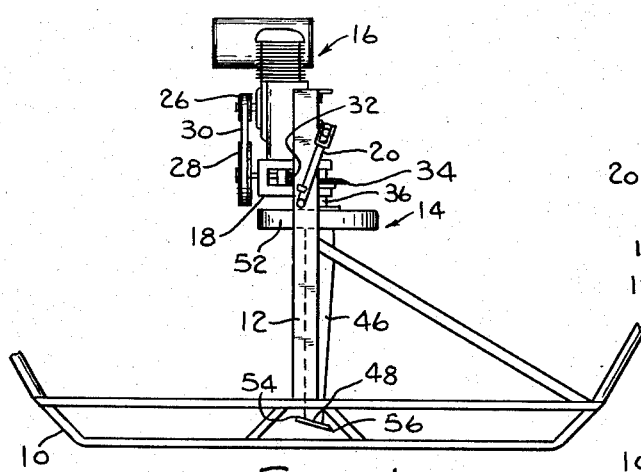
FIG. 1
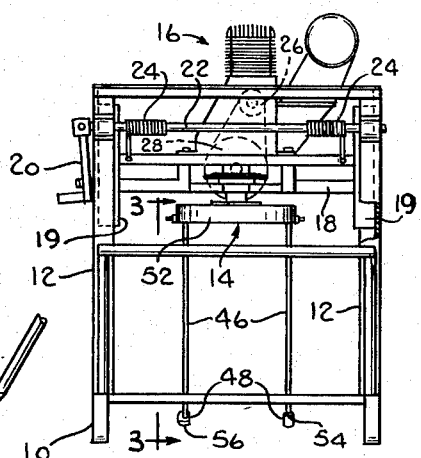
FIG. 2
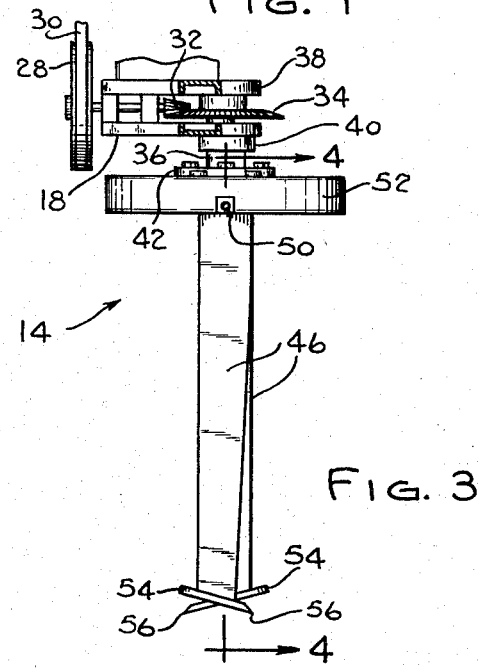
FIG. 3
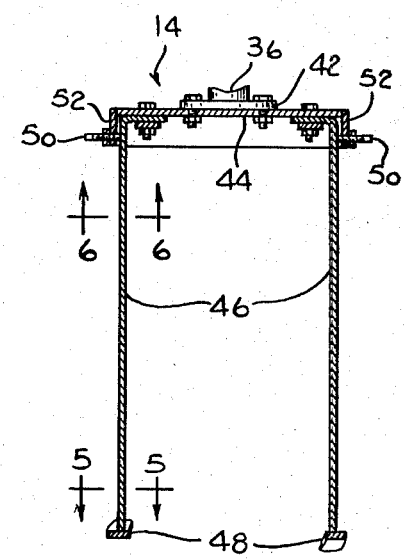
FIG. 4
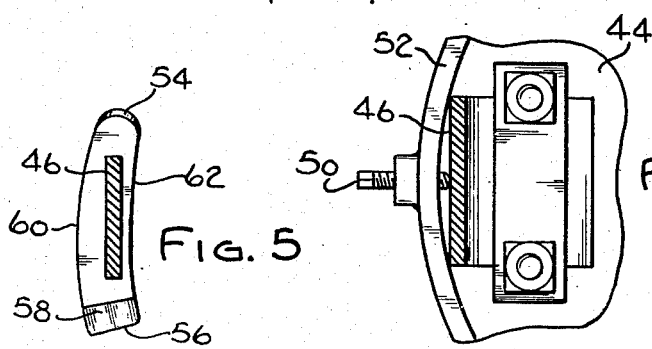
FIG. 5
FIG. 6
INVENTOR.
CURTIS T. FOLSTAD
BY John W. Michael
ATTORNEY

Patented Oct. 26, 1954

2,692,757

UNITED STATES PATENT OFFICE 2,692,757

ICE-CUTTING DEVICE

Curtis T. Folstad, Menominee, Mich.

Application June 9, 1952, Serial No. 292,470

3 Claims. (Cl. 255—61)

This invention relates to apparatus for cutting holes in ice on frozen lakes, etc. to facilitate the setting of nets by commercial fishermen.

In the past it has been customary to employ auger type cutters for cutting holes in ice. Such cutters require considerable power and the general practice has been to employ automotive engines for the drive. As distinguished from the auger cutter the present cutter merely cuts a circular path so that a core is left in the hole when the cutter is removed. The core may be pulled up on top of the ice or may be pushed under the ice shelf. The power required to drive the present cutter is relatively small, running in the neighborhood of four to six horsepower.

The principal object of this invention is to provide a cutter which requires little power.

Another object is to provide cutting apparatus which is less expensive than the apparatus presently employed.

Still another object is to provide a cutter which will cut through a given thickness of ice much faster than auger type cutters.

The present cutter, in addition to requiring little power, has further advantages in that the cutting time is about one-sixth the time required to cut a similar hole with an auger cutter. Another advantage is that the cost of the various parts is greatly reduced.

Other objects and advantages will be pointed out in, or be apparent from, the specification and claims, as will obvious modifications of the single embodiment shown in the drawings, in which:

Fig. 1 is a side elevation of the cutter apparatus mounted on a sled;

Fig. 2 is an end elevation of the apparatus shown in Fig. 1;

Fig. 3 is an enlarged side elevation of the cutter;

Fig. 4 is a section taken on line 4—4 of Fig. 3; and

Figs. 5 and 6 are sections taken on lines 5—5 and 6—6, respectively, of Fig. 4.

Considering the drawings in detail, the entire apparatus is mounted on a sled having interconnected parallel runners 10, 10 supporting vertical posts 12, 12. Cutter 14 and engine 16 are mounted on a crosshead 18 carried by shoes 19 slidably mounted on posts 12, 12 for vertical movement as regulated by crank 20 which may be turned to rotate shaft 22 on which cables 24, 24, connected to crosshead 18, are wound. Therefore the crank may be turned to raise the cutter apparatus above the ice and may be operated to regulate lowering of the cutter by gravity during the cutting operation.

The engine drive sheave 26 is connected to jack shaft pulley 28 by V-belt 30 and the jack shaft in turn rotates the cutter about a vertical axis through bevel gears 32, 34. The cutter itself is mounted on a shaft 36 driven by gear 34 and supported for rotation in thrust bearings 38, 40.

The cutter drive shaft 36, as shown in Fig. 4, is provided with a flange 42 which is bolted to circular head 44. The cutter arms 46, 46 are bolted to the underside of head 44 so that the blades 48 at the lower end of each arm will track in substantially the same path. Adjustment bolts 50, 50 threadably engage with and project radially inwardly from skirt or flange 52 welded to and depending from head 44 to permit adjustment of the path of each of the blades to insure proper tracking thereof.

Each blade 48 at the lower extremity of the arms is mounted so that its heel 54 is above the cutting edge 56. This inclination of the blade, together with the inclination of the cutting face 58 of the blade, throws the ice chips upwardly out of the groove being cut thus keeping the groove free of chips which would otherwise interfere with the cutting action. It will also be noted, as shown in Fig. 5, that in plan view the outer blade edge 60 is an arc having a center substantially coincident with the center of rotation of the cutter so that there is no tendency for the arms to drift towards the center of rotation. Similarly the inner edge 62 of the blade is formed as a curve which, in plan view, is substantially concentric with the axis of rotation to prevent spreading of the arms. This construction results in considerable stability in spite of the length of the arms.

In models thus far produced a cutting edge approximately one inch wide has been employed which, of course, cuts a circular groove of approximately one inch. The diameter has run up to twenty-four inches and such a drill has cut through eighteen inches of ice in twenty to thirty seconds. If longer cutter arms are employed the cutter may be employed to cut through thirty to thirty-six inches of ice.

The operation of the present rig should now be apparent. The cutter is raised above the surface of the ice and the engine connected to the cutter by means of a clutch (not shown). The crank is then manipulated to lower the cutter onto the ice. Gravity will supply all the force necessary to hold the cutter on the ice and insure proper formation of the cut.

Although but one embodiment of the present invention has been illustrated and described, it will be apparent to those skilled in the art that various changes and modifications may be made therein without departing from the spirit of the invention or from the scope of the appended claims.

I claim:

1. Apparatus for cutting holes in the ice comprising, a head mounted for rotation about a substantially vertical axis, a plurality of arms depending from said head parallel to and equally spaced from said axis so that each arm will move in substantially the same path when the head is rotated, a blade mounted on the lower end of each arm with the cutting edge of the blade facing in the direction of rotation and positioned lower than the trailing portion of the blade so as to throw ice chips upwardly, the inner and outer edges of said blades being substantially concentric with the axis when viewed in plan view so that each blade tracks in the cut without tending to spread the arms apart or move the arms towards each other, and a bolt connected to the head adjacent each of said arms and adapted to adjustably bear on the arm with which it cooperates at a point remote from the point of connection between the arm and the head.

2. Apparatus for cutting holes in the ice comprising, a head mounted for rotation about a substantially vertical axis, a plurality of arms depending from said head parallel to and equally spaced from said axis so that each arm will move in substantially the same path when the head is rotated, a blade mounted on the lower end of each arm with the cutting edge of the blade facing in the direction of rotation and positioned lower than the trailing portion of the blade so as to throw ice chips upwardly, the inner and outer edges of said blades being substantially concentric with the axis when viewed in plan view so that each blade tracks in the cut without tending to spread the arms apart or move the arms towards each other, a peripheral skirt depending from said head, and bolts threadably mounted in said skirt and projecting inwardly in a generally radial direction to bear against the arms.

3. Apparatus for cutting holes in ice comprising, a sled supporting two generally parallel vertical posts, a crosshead slidably mounted on the post, a cutter head rotatably mounted on the crosshead for rotation about a generally vertical axis, means for rotating said cutter head, means for raising and lowering said crosshead on said posts, a plurality of arms depending from said cutter head substantially parallel to and spaced equally from the axis of rotation of the cutter head, a blade mounted at the lower end of each of the arms and inclined downwardly and forwardly so that the cutting edge is lowermost and faces in the direction of rotation, the inner and outer edges of said blades being substantially concentric with said axis of rotation when the blades are viewed in plan view, a peripheral skirt depending from said cutter head, and a bolt threadably mounted in the skirt adjacent each of the arms to adjustably bear against the arms to adjust the blades to track in substantially the same circular path.

References Cited in the file of this patent

UNITED STATES PATENTS

| Number | Name | Date |
|---|---|---|
| 178,675 | Root | June 13, 1876 |
| 286,599 | Fitzgerald | Oct. 16, 1883 |
| 412,857 | McCall | Oct. 15, 1889 |
| 1,731,872 | Schons | Oct. 15, 1929 |
| 2,301,478 | Tibbals, Jr., et al. | Nov. 10, 1942 |